United States Patent [19]

Sabolish

[11] Patent Number: 5,135,093
[45] Date of Patent: Aug. 4, 1992

[54] CLUTCH PLATES FOR MANUAL TRANSMISSIONS

[76] Inventor: James P. Sabolish, Star Rte. Box 115, Clancy, Mont. 59634

[21] Appl. No.: 709,157

[22] Filed: Jun. 3, 1991

Related U.S. Application Data

[63] Continuation-in-part of Ser. No. 475,791, Feb. 6, 1990, abandoned.

[51] Int. Cl.⁵ .................................................. F16D 3/14
[52] U.S. Cl. ............................. 192/106.2; 192/70.13; 192/DIG. 1
[58] Field of Search .............. 192/106.2, 70.13, 110 S, 192/DIG. 1

[56] References Cited

U.S. PATENT DOCUMENTS

| | | | |
|---|---|---|---|
| 1,940,947 | 12/1933 | Hand | 192/110 S |
| 1,991,569 | 2/1935 | Nickles | 192/70.13 |
| 2,159,326 | 5/1939 | Harwood et al. | 192/110 S |
| 4,325,466 | 4/1982 | Klaue | 192/70.13 X |
| 4,449,621 | 5/1984 | F'Geppert | 192/70.13 |
| 4,512,450 | 4/1985 | Babcock | 192/70.13 X |

Primary Examiner—Leslie A. Braun
Assistant Examiner—Andrea Pitts
Attorney, Agent, or Firm—William F. Frank

[57] ABSTRACT

The present invention is an improvement over the existing art in that the plate or plates carrying the friction pads are formed in two equal tight-fitting semi-circular sections. It is also within the scope of the present invention that the rear plate encompassing the drive shaft may be similarly formed as two semi-circular portions. This is primarily because the rear plate has splines on the hub which interact with the splines on the drive shaft.

2 Claims, 2 Drawing Sheets

CLUTCH PLATES FOR MANUAL TRANSMISSIONS

This application is a continuation-in-part application of Ser. No. 07/475,791 filed Feb. 6, 1990 and now abandoned upon the filing of this application.

FIELD OF INVENTION

The present invention is in the general field of transmissions for automotive vehicles. More specifically, the invention is in the field of clutches for mechanical transmission vehicles as contrasted with vehicles having automatic transmissions.

BACKGROUND OF THE INVENTION

Those who work on automotive transmissions, be they individual drivers or mechanics in established repair facilities, are very familiar with the procedures and problems involved in changing or replacing the clutch assembly n the manual transmission portion of the driving system for automotive vehicles. Under presently known arrangements, to change a clutch assembly or to replace a worn member, it is necessary to elevate the vehicle, place appropriate jacks or supporting devices beneath the transmission, as well as the drive shaft from the transmission to the driving wheels. It is then necessary to disassemble the connection between the vehicle engine portion of the transmission and the mechanism which rotates the drive shaft. This requires, among other things, that the transmission cover be removed, the clutch fork be disengaged from the clutch, and the drive shaft then be pulled back from the transmission assembly and lowered to a support. Then, it is necessary to pull out the clutch assembly, disassemble it and replace the friction plate or other element within the clutch assembly. Such assemblies are known from the McLeod patents which are dominant in this area. They consist of a front plate and a back plate and two clutch friction plates which are positioned back to back. Each clutch friction plate contains a circular element having a hub and openings in its surface for a plurality of helical springs which are utilized in the shifting of the transmission to alternately engage and disengage the friction clutch to permit the shifting of the gears. Each friction plate also carries four extending arms on its outer surface which contain four pads which, on the plate surface facing the engine can be engaged with the driving plate from the engage, and on the other plate surface facing the rear of the vehicle to transfer the power from the engine to the drive shaft via the two plates. The pads are mounted on the exterior surface of each friction plate and on what might be referred to as angled, L-shaped, spoon-shaped elements, each element terminating in a portion to which a pad is attached and which pad per se can be replaced as the clutch wears out, which angled L-shaped arm is bolted to its plate in each instance. It may be appropriate to again review the structure of the friction plate assembly bearing the pads which basically comprises the central part of the clutch system in a manual transmission system. There are two center plates, which have been discussed before, each of which contains a plurality of friction pads on each outer surface. Each friction pad bearing plate itself being a segmented unit comprising eight trapezoidal-type plates, each of which has attached to it, by rivets, the pads and their respective supporting arms. There is also a front plate which encompasses the outer central or hub portion of one pad bearing plate surface having eight apertures therein for the helical springs which are contained with the clutch. The front plate has a circular opening therein having no extrusions or obtrusions therein. The rear plate consists of a circular plate which encompasses the central portion of the other pad bearing plate surface having therein eight recesses for the helical springs mentioned before. The rear plate has a central opening which contains a plurality of grooves and lands which correspond to the grooves and lands in the driven shaft. Thus, it is readily apparent that under the present status of the clutch relationship with the drive shaft of a vehicle, that the grooves and lands on the interior surface of the rear plate must coincide with the grooves and lands on the drive shaft. Those of knowledge, either be it practical or theoretical, realize that the transmission contains a drive mechanism which can be engaged by the friction pads on the surface of the rear plate carrying the drive shaft but are also controlled by the other plate with its pads in its movement in and out of contact with the fly wheel by the pressure plate on the exterior side of the clutch assembly.

Another assembly related to the foregoing McLeod type clutch comprises only a single clutch friction plate comprising a circular element with a central hub opening and two outer surfaces, the plate having openings and through the outer surfaces for a plurality of helical springs which are utilized in the shifting of the transmission to alternately engage and disengage the friction clutch to permit the shifting of gears. The friction plate carries four extending arms on each of its outer surfaces. Each arm on the surface contains a pad which, on the plate surface facing the engine can be engaged with the driving plate in the engine and on the plate surface facing the rear of the vehicle can transfer the power from the engine via the plate to the friction plate on the drive shaft. Each arm on both exterior surfaces of the single friction plate consists of an angled, spoon-shaped element terminating in the portion to which the pad is attached and which pad per se can be replaced as the clutch wears out. This single plate assembly includes a front circular plate which encompasses the central or hub portion of one of the outer surfaces of said single plate, the front plate having eight apertures therein for the helical springs which are contained in said apertures. This assembly also comprises a rear circular plate having eight recesses therein and which encompasses the central portion of the single pad bearing plate and has eight recesses therein to receive the aforementioned helical springs. The rear plate has a central opening as a hub which contains a plurality of lands and grooves which correspond in size and spacing to the lands and grooves on the drive shaft.

SUMMARY OF THE PRESENT INVENTION

The present invention is an improvement over the existing art in that the plate or plates carrying the friction pads are formed in two equal tight-fitting semi-circular sections. It is also within the scope of the present invention that the rear plate encompassing the drive shaft may be similarly formed as two semi-circular portions. This is primarily because the rear plate has splines on the hub which interact with the splines on the drive shaft.

BRIEF DESCRIPTION OF THE DRAWINGS

The present invention will be seen in the accompanying drawings which show a preferred form of the present invention.

Figure 1:
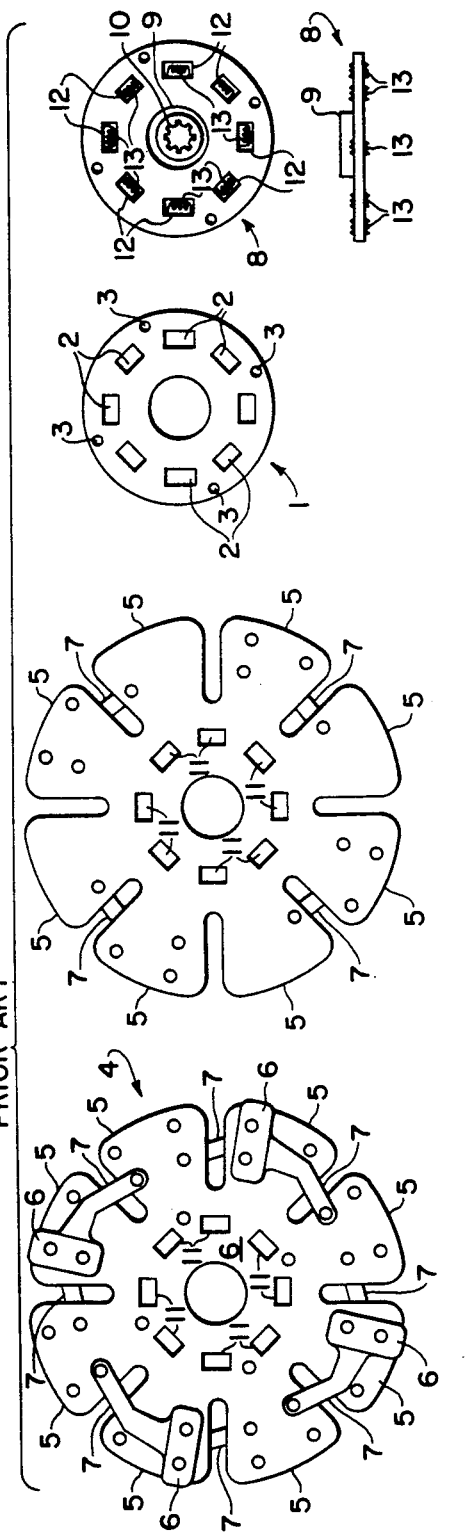
FIG. 1 is an expanded view of one embodiment of the prior art showing the principal components of the clutch friction pad assembly seen in plan view.

Those of skill in the automotive repair art will readily recognize that FIG. 1 discloses the disassembled clutch assembly in which the front plate 1 contains recesses 2 for the helical springs which are part of the McLeod patent. The front plate also contains four apertures 3 which receive bolts (not shown) which connect the components together. There are two identical clutch pad bearing plates mounted back to back. The interior surface of each plate is smooth. The outer surface of each plate carries the friction pads. Each clutch pad bearing plate 4 is seen to comprise a plurality of trapezoidal units 5 extending outwardly from a central section 6. Shown in a top plan view, the outer surface of each clutch pad bearing plate 4 has attached to the trapezoidal extensions four friction pads 7 which are riveted to every other trapezoidal extension and are riveted to the intervening trapezoidal extensions by an arm 8. The reverse side of each plate 4 is identically constructed except for the friction pads and support arms. These clutch pads are of conventional type and, per se, are not a part of the present invention other than they continue to be used with the present invention. The remaining portion of the clutch pad assembly is the plate 9 which is substantially identical to the plate 1, with the exception of the presence of a hub 10 which contains on its inner surface a plurality of splines 11 which mate with the splined end of the drive shaft (not shown). The clutch pad bearing plates each contain eight apertures 12 and plate 9 also contains eight apertures 13, each of which contains a helical spring 14, apertures 12 and 13 mating with apertures 2 in the plate where they are joined by the aforementioned bolts (again, not shown). The clutch is assembled by placing plate 1 on the pad bearing surface of plate 4, placing plate 9 over plate 1 and bolting the plates together. It will be readily apparent to those of skill in the art that the assembled clutch pad assembly of the prior art will require that the transmission be separated from the drive shaft of the vehicle engine, and the drive shaft removed from the clutch assembly, in order to remove the splined hub of the clutch pad assembly 4 from the end of the drive shaft.

Figure 2:
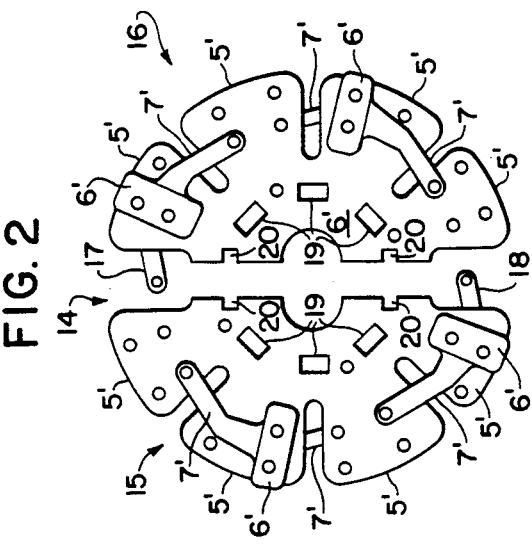
FIG. 2 is a plan view of the present invention applied to FIG. 1 showing each friction pad plate as two semi-circular units.

Referring now to FIG. 2, it will be seen that each clutch pad bearing plate, indicated generically by 15, is divided into two semi-circular sections 16 and 17. Only one plate is shown and described. Unless numerically designated otherwise, all like components seen in FIG. 1 are indicated by the same numeral with a prime "'" added. Each section 16 and 17 bears two of the clutch friction pads 7' which are identical to the similar pads in the prior art. It will be also noted that to assist in joining the two friction pad bearing portions together that two of the L-shaped arms 18 and 19 on the other clutch bearing plate not shown can be bolted to the respective adjacent trapezoidal extension. Each semi-circular clutch friction pad bearing-portions 16 and 17 contains three full apertures 20 and two half apertures 21. It will be noted that the present invention in FIG. 2 is employed with at least one of the same plate 1, and plate 9 which are identical to the corresponding plates in FIG. 1. Additionally, the L-shaped arms 18 and 19 are bolted into the respective adjacent trapezoidal extension when sections 16 and 17 are assembled to insure that the friction pad bearing plate of FIG. 2 when assembled around the drive shaft has the same rigidity as in the prior art.

Figure 3:
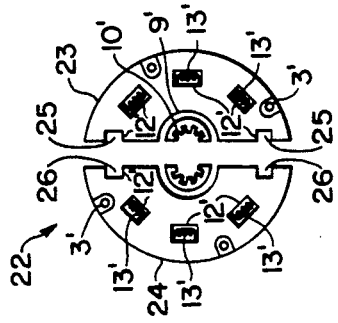
FIG. 3 is a plan view showing the rear plate in an additional embodiment of the present invention.
Figure 4:
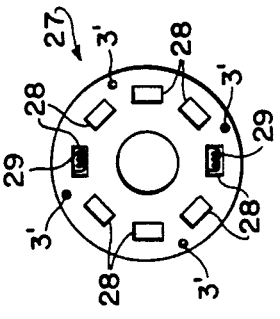
FIG. 4 is an additional plate employed with the embodiment in FIG. 3.

Referring to FIG. 3, it will be seen that the rear plate 22 in the present invention is divided into two semi-circular portions 23 and 24 which, when joined together, are substantially identical to the solid rear plate of the prior art. Those components in FIG. 3 which are identical to those in FIG. 1 carry the same numerical designation with the addition of a prime "'". It is to be noted that portions 23 and 24 have openings 25 and 26 respectively but that there are no springs provided for these openings. FIG. 4 discloses a plate 17 similar to plate 9 in the prior art, having openings 28 and two springs 29. When the clutch is assembled with this embodiment, the procedure is the same as described for the embodiment of FIG. 2 with the addition of plate 27 over assembled plate 22, openings 28 therein fitting over springs 13' in plate 22 and springs 29 of plate 27 fitted into openings 25 and 26 of plate 21. The addition of plate 27 appears to provide an additional restriction of plate 21 about the drive shaft.

Figure 5:
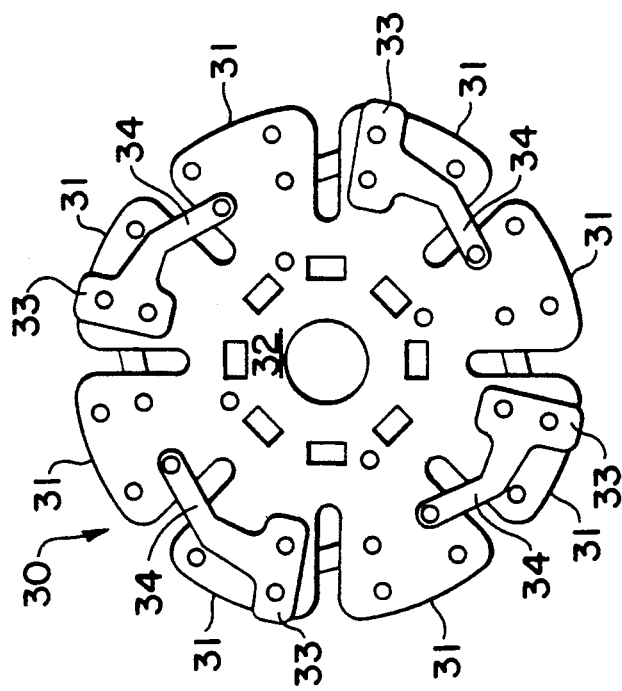
FIG. 5 is an expanded plan view of a second embodiment of the prior art showing the principal components of the clutch pad assembly, the opposing view being identical.

FIG. 5 differs from FIG. 1 solely in that the clutch pad assembly is a single plate with clutch friction pads mounted on both sides of the plate. The front plate and rear plate shown and described relative to FIGS. 1-3, are used with this embodiment. The clutch pad bearing plate 30 comprises a plurality of trapezoidal units 31 extending outwardly from a central section 32. Shown in a top plan view, the one surface of the clutch pad bearing plate 30 has attached to the trapezoidal extensions four friction pads 33 which are riveted to every other trapezoidal extension and are riveted to the intervening trapezoidal extensions by an arm 34. The opposite surface of plate 30 is identically constructed. These clutch pads are of conventional type and, per se, are not a part of the present invention.

Figure 6:
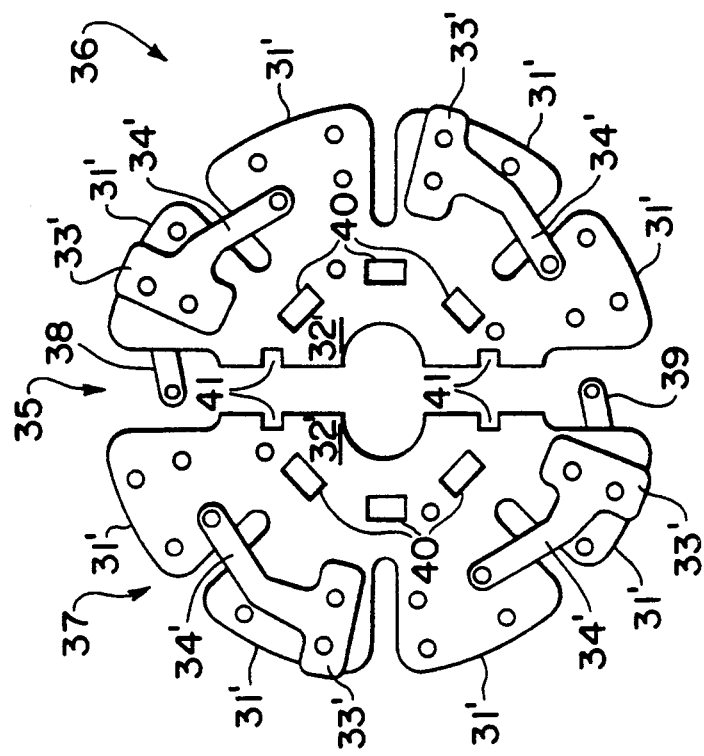
FIG. 6 is an expanded view of the present invention applied to FIG. 5, both sides being identical.

Referring now to FIG. 6, it will be seen that the clutch pad bearing plate, indicated generically by 35, is divided into two semi-circular sections 36 and 37. Unless numerically designated otherwise, all components seen in FIG. 5 are indicated by the same numeral with a prime "'" added. Each section 36 and 37 bears two of the clutch friction pads 33 which are identical to the similar pads in the prior art. It will be also noted that to assist in joining the two friction pad bearing portions together that two of the L-shaped arms 38 and 39 on the surface of the clutch bearing plate not shown can be bolted to the respective adjacent trapezoidal extension. Each semi-circular clutch friction pad bearing-portions 36 and 37 contains three full apertures 40 and two half apertures 41. It will be noted that the present invention in FIG. 6 is employed with at least one of the same front plate 1, and rear plate 9' used with FIG. 2. Additionally, the L-shaped arms 38 and 39 are bolted into the respective adjacent trapezoidal extension when sections 36 and 37 are assembled to insure that the friction pad bearing plate of FIG. 6 when assembled around the drive shaft has the same rigidity as in the prior art.

The provisions of the two semi-circular friction pad bearing portions of the present invention will make it very apparent to one of skill in the art that in order to replace the clutch friction pad bearing plate of the prior assembly, it is only necessary to remove the bolts from the previously described apertures and then to remove each semi-circular friction pad bearing portion from the clutch friction pad assembly and replace it with one in which the pads are new. Thus, it can be readily observed that the present invention eliminates the necessity to remove the transmission from the engagement with the drive shaft of the vehicle engine, as well as removing the drive shaft from the clutch assembly.

What is claimed is:

1. A clutch assembly for a mechanical transmission having at least one front plate and first and second rear plates in conjunction with a pair of segmented circular friction pad bearing plates, at least one front plate having eight openings from springs, said first rear plate being segmented and containing three springs and two half openings for springs in each segment, said second rear plate containing eight openings with two springs in diametrally opposing openings, said first and second rear plates being so positioned that the springs in said first rear plate fit into said openings in said second rear plate and said springs in said second rear plate fit into said openings in said first rear plate.

2. A clutch assembly for a mechanical transmission having at least one front plate and first and second rear plates in conjunction with a single segmented circular friction pad bearing plate, at least one front plate having eight openings for springs, said first rear plate being segmented and containing three springs and two half openings for springs in each segment, and second rear plate containing eight openings with two springs in diametrally opposing openings, said first and second rear plates being so positioned that the springs in said first rear plate fit into said openings in said second rear plate and said springs in said second rear plate fit into said openings in said first rear plate.

* * * * *